United States Patent [19]

Suwala et al.

[11] Patent Number: 5,141,988

[45] Date of Patent: * Aug. 25, 1992

[54] BLISTER RESISTANT PAPER COATING LATEX

[75] Inventors: David W. Suwala; Emil G. Sammak, both of Dover, Del.

[73] Assignee: Reichhold Chemicals, Inc., Durham, N.C.

[*] Notice: The portion of the term of this patent subsequent to Aug. 21, 2007 has been disclaimed.

[21] Appl. No.: 565,629

[22] Filed: Aug. 10, 1990

Related U.S. Application Data

[63] Continuation-in-part of Ser. No. 383,231, Jul. 18, 1989, Pat. No. 4,950,711, which is a continuation of Ser. No. 295,435, Jan. 10, 1989, abandoned.

[51] Int. Cl.$^5$ .............................................. C08L 37/00
[52] U.S. Cl. .................................... 524/548; 524/552; 524/556; 524/558; 524/559; 524/562; 524/724; 524/750

[58] Field of Search ................ 524/750, 724, 548, 552, 524/556, 558, 559, 562

[56] References Cited

U.S. PATENT DOCUMENTS

| | | | |
|---|---|---|---|
| 4,429,074 | 1/1984 | Mishiba et al. | 524/819 |
| 4,950,711 | 8/1990 | Suwala et al. | 524/819 |

FOREIGN PATENT DOCUMENTS

| | | | |
|---|---|---|---|
| 0969115 | 9/1964 | United Kingdom | 524/822 |

Primary Examiner—Joseph L. Schofer
Assistant Examiner—J. M. Reddick
Attorney, Agent, or Firm—Rodman & Rodman

[57] ABSTRACT

An improved blister resistant paper coating polymer latex for paper coating comprising an aliphatic conjugated diene monomer, monoethylenic monomers and an ethylenically unsaturated carboxylic acid monomer and including a molecular weight modifier such as an organosulfur compound and a base.

25 Claims, 2 Drawing Sheets

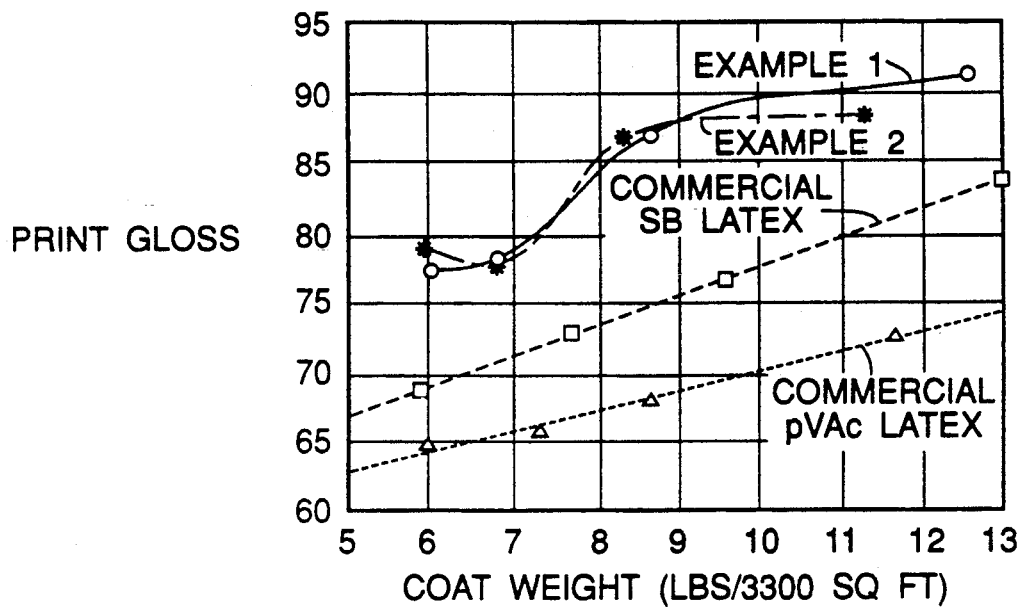
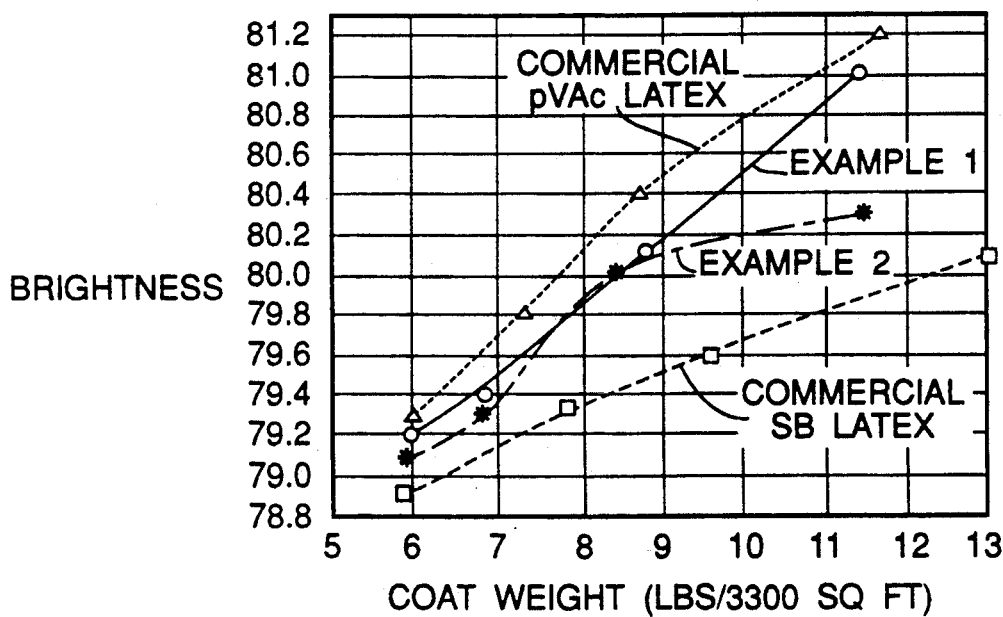

BLISTER RESISTANT PAPER COATING LATEX

CROSS REFERENCE TO RELATED APPLICATIONS

This application is a continuation-in-part of application Ser. No. 383,231 filed Jul. 18, 1989 now U.S. Pat. No. 4,950,711, which is a file wrapper continuation of application Ser. No. 295,435 filed Jan. 10, 1989 now abandoned.

BACKGROUND OF THE INVENTION

1. Field of the Invention

The present invention relates to styrene-butadiene latices suitable for use as binders in coated papers to be printed by the web offset process.

2. Description of the Prior Art

The term "paper" is traditionally applied to felted or matted sheets of cellulose fibers, formed on a fine wire screen, such as in the Fourdrinier machine, from a dilute water suspension. The fibers are bonded together as the water is removed and the sheet is dried. The tendency of cellulose fibers to bond together, when dried from a water suspension is basic to papermaking technology.

Most of the water used in the manufacture of paper is removed mechanically when the web is carried through a series of press rolls. The sheet progresses to the drier section at about 33% consistency. Most of the remaining water is removed by evaporation. However, small amounts of water, on the order of about 2.5 to 5.0% by weight remain in the paper. These amounts of moisture are difficult to remove, and provide the web offset paper with the flexibility that is essential for handling.

An extremely dry web of paper would be brittle and tend to break when subjected to stresses in the web offset printing press. Even if an abnormally dry web of paper were to pass through a press without breaking, it would increase in size from the absorption of moisture from the air and it would be difficult to maintain register.

Paper that is to be printed upon is ordinarily coated with a pigment and latex binder to provide a smooth surface upon which a glossy, brilliant, detailed inked image is applied. The latex binder must be able to impart high ink holdout so that an image of maximum vividness and intensity can be obtained with as thin a film of ink as possible. The requirement that a latex impart high ink holdout, coupled with the use of extra adhesive to obtain sufficient surface strength for web offset printing has often resulted in a non-porous paper surface.

The printing of paper on a high speed web offset press requires the ink to dry very rapidly. The primary means for drying and setting the ink film is through evaporation of the solvent from the ink. This is often accomplished in a press dryer by impinging a gas flame or a high velocity stream of hot air on the printed web. The temperature of the air in a heatset dryer generally varies from about 500° to 600° F. The surface temperature of the web when it exits the dryer can reach temperatures as high as 375° F.

When the printed web is suddenly exposed to high temperature, the moisture in the paper is explosively vaporized. The vapor pressure must be allowed to exit through the coating or it will generate internal stresses within the paper. If the internal bonds are too weak to withstand the sudden outrush of vapor, an eruption in the form of a blister occurs on the paper surface.

Conventional styrene-butadiene-bound coatings have high ink holdout, low porosity and a marked tendency to blister. Traditionally, polyvinyl acetate latex binders have been used to alleviate the blister problem in web offset papers. See Walsh et al, "Polyvinyl Acetate Latex," TAPPI MONOGRAPH SERIES No. 37, p. 98 (1975) and Stoutjesdijk et al, PAPER TECHNOLOGY, vol. 15, no. 4, pages 209 to 212 (1974).

Unfortunately, polyvinyl acetate latex has often been implicated as the cause of deposits on the papermaking machinery referred to as "white pitch" which occurs when a significant amount of waste paper and trimmings, known as "broke," containing the polyvinyl acetate latex is recycled in the papermaking process.

Efforts have been made to develop a blister resistant styrene/butadiene binder. U.S. Pat. No. 4,429,074 to Mishiba et al discloses a coating composition for paper which comprises a mineral pigment and a polymer latex which is the product of emulsion polymerization of an aliphatic conjugated diene monomer, an ethylenically unsaturated carboxylic acid monomer, and a monoolefinic monomer in a weight proportion of 24.5 to 50:0.5 to 5:45 to 75 in the presence of carbon tetrachloride and an alkyl mercaptan.

The aforesaid Mishiba et al patent discloses that the combination of carbon tetrachloride and alkyl mercaptan in the polymerization of a polymer latex decreases the smell on irradiation by ultraviolet rays, improves adhesive strength, water resistance and blister resistance of the paper coated with such composition. Mishiba et al also discloses that the use of alkyl mercaptan alone, enhances the formation of coagula in the produced polymer latices, deteriorates mechanical stability and generates an unfavorable smell on irradiation with ultraviolet rays.

Hagymassy et al, "An Investigation of the Web Offset Blister Problem", TAPPI, Vol 61 pages 59–62 (Jan. 1978) discloses styrene-butadiene binders with improved room temperature porosity but the resultant coatings blistered at lower temperatures than coatings with polyvinyl acetate, and the polymer failed to melt at the same temperature as does polyvinyl acetate.

The use of organosulfur compounds, such as mercaptans, as molecular weight modifiers and plasticizers in emulsion polymerization systems, including those for producing styrene-butadiene copolymers, is disclosed in U.S. Pat. Nos. 4,064,337 and 4,245,072 to Uraneck et al, U.S. Pat. No. 2,316,949 to Garvey, and U.S. Pat. No. 2,543,845 to Fryling.

SUMMARY OF THE INVENTION

The present invention relates to an improved blister resistant paper coating polymer latex comprising an aliphatic conjugated diene monomer, a monoethylenic monomer, an ethylenically unsaturated carboxylic acid monomer, a molecular weight modifier, and a base.

DESCRIPTION OF THE DRAWINGS

In the accompanying drawings,

FIG. 1 is a graphical representation of coating print gloss to variations in coating weight for different latex compositions;

FIG. 2 is a graphical representation of brightness to variations in coating weight for different latex compositions;

DESCRIPTION OF THE PREFERRED EMBODIMENTS

Figure 3:
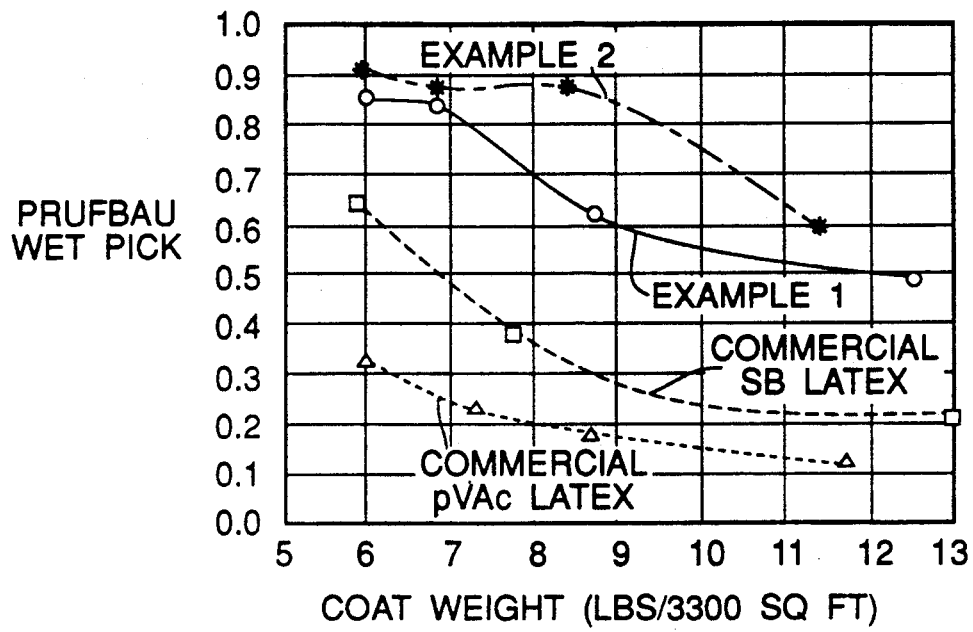
FIG. 3 is a graphical representation of prufbau wet pick to variations in coating weight for different latex compositions.

In accordance with the present invention, an improved polymeric latex for paper coating is produced from an aliphatic conjugated diene monomer, an ethylenically unsaturated carboxylic acid monomer, and a non-carboxylic monoethylenic monomer in the presence of an organosulfur molecular weight modifier and a base, in amounts sufficient to improve the blister resistance of paper coated with the polymeric latex. Notably, the inventive polymeric latex does not contain alkyl halides such as carbon tetrachloride or carbon tetrabromide which are considered objectionable to the environment. The Consumer Products Safety Commission has characterized carbon tetrachloride as a toxic and carcinogenic compound.

The inventive polymeric latex shows dramatically improved resistance to blistering of paper coatings under conditions that exist in the web offset drying oven wherein surface temperatures can reach 375° F. The result is faster printing speeds while retaining the improved rheological and printing characteristics associated with styrene-butadiene latexes.

The non-carboxylic monoethylenic monomer that is copolymerizable with the monomeric components can be a vinyl aryl compound, such as styrene, alpha-methylstyrene, methyl-alpha-methylstyrene, and vinyltoluene; alkyl esters of unsaturated carboxylic acids such as methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, β-hydroxyethyl acrylate, and 2-ethyl-hexyl acrylate; and vinyl cyanide compounds, such as acrylonitrile, methacrylonitrile, and the like.

The amount of non-carboxylic monoethylenic monomer can vary from about 10 to 90%, preferably about 30 to 70% by weight of the polymeric latex.

The aliphatic conjugated diene monomer can be 1,3-butadiene, 2-methyl-1,3-butadiene, 2-chloro-1,3-butadiene, and the like. The aliphatic conjugated diene monomer can vary from about 10 to 90%, preferably 30 to 70% by weight of the polymeric latex.

Ethylenically unsaturated carboxylic acid monomers include acrylic acid, methacrylic acid, itaconic acid, fumaric acid, maleic acid, the $C_1$ to $C_8$ alkyl half esters of fumeric, maleic and itaconic acid, and the like. The amount of ethylenically unsaturated acids can vary from about 1 to 20% by weight of the polymeric latex, and preferably about 3 to 10% by weight.

Other monomers that can be employed as part of the copolymerizable latex composition include alkyl esters of unsaturated carboxylic acids, such as methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, 2-ethyl-hexyl acrylate; vinylidiene chloride. The amount of other monomers can vary from about 2 to 20% by weight of the polymeric latex, and preferably about 6 to 10% by weight.

Examples of the organosulfur molecular weight modifiers include mercaptans, mercaptoalcohols such as mercaptoethanol, diaryl disulfides such as diphenyl disulfide, and the like. Most preferred molecular weight modifiers include alkyl mercaptans, such as n-octyl mercaptan, n-dodecyl mercaptan, t-dodecyl mercaptan, t-hexadecyl mercaptan, t-tetradecyl mercaptan, n-tetradecyl mercaptan, and the like. The amount of molecular weight modifiers can vary from about 0.5 to 5%, and preferably about to 3% by weight of the polymeric latex. It has been found that these higher levels of molecular weight modifiers provide significant improvements in blister resistance.

Also important in the blister resistant composition is the presence of inorganic or organic bases. Most broadly a base is a substance which dissociates on solution in water to produce one or more hydroxyl ions. The Bronsted base is any compound which can accept a proton. Thus $NH_3$ is a base since it can accept a proton to form ammonium ions.

$$NH_3 + H^+ \rightarrow NH_4^+$$

A Lewis base is anything which has an unshared pair of electrons. Thus in the reaction

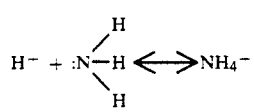

$NH_3$ is a base because it possesses an unshared pair of electrons.

The strength of a base can also be defined as the tendency to accept a proton. A table listing many acids in order of decreasing acid strength with their corresponding conjugate bases in order of increasing base strength appears in March, "Advanced Organic Chemistry", pages 220–222 (3rd Edition, John Wiley & Sons).

A relatively weak base in March's table is the carboxylic acid anion, $RCOO^-$, which, depending on the size of the R group, might have a $pK_b$ between 9 and 10. The somewhat stronger monoalkyl amine, $RNH_2$, would have a $pK_b$ between 3 and 4.

The $pK_b$ of bases suitable in the present invention can vary from $-4$ to 18 with the preferred pKb from $-1.7$ to 4.2, wherein $pKb = -\log K_b$;
$K_a K_b = K_w$;
$K_a$ = equilibrium constant for dissociation of acid;
$K_b$ = equilibrium constant for dissociation of base;
$K_w$ = ionization constant of pure water = $10^{-14.00}$ at 25° C.

Examples of organic bases containing nitrogen which can be used include the aryl amines such as N-phenyl aniline, aniline, ethyl aniline, dimethyl aniline and the like; the alkyl amines such as n-decyl amine (primary amines), diethylamine (secondary amines), diethanolamine, triethylamine (tertiary amines), diethylenetriamine and the like; the cyclic amines (both saturated and unsaturated) such as piperidine, piperazine, morpholine, pyridine, indole and the like; aliphatic amino acids such as glycine, alanine, serine, lysine and the like; aromatic amino acids such as phenyl alanine, tyrosine and the like; the cyclic lactams of amino acids such as 2-pyrrolidone and N-methyl pyrrolidone; the primary amides such as acetamide and N-ethylacetamide and the like; secondary amides such as succinimide and the like; and diamides such as urea and the like.

Examples of organic bases containing oxygen which can be used include the alkali metal and ammonium salts of carboxylic acids such as formic, acetic, propionic acids and the like; the alkali metal, and ammonium salts of dibasic carboxylic acids such as oxalic, malonic, succinic acids and the like; the alkali metal and ammonium salts of unsaturated carboxylic acids such as acrylic, methacrylic, maleic, fumaric acids and the like.

The alkali metals include lithium, sodium, and potassium. The quaternary alkyl ammonium cations include tetramethyl ammonium, tetraethyl ammonium, tetrapropyl ammonium, and tetrabutyl ammonium.

Other organic bases include quaternary alkyl ammonium hydroxides, hydrosulfides, carbonates, bicarbonates, fluorides, nitrites, nitrates, sulfates and the like, preferably where the alkyl moiety is represented by tetramethyl, tetraethyl or tetrabutyl.

Examples of inorganic bases which can be used include alkali metal and ammonium hydroxides, hydrosulfides, carbonates, bicarbonates, fluorides, nitrites, nitrates, sulfates and the like.

The base can vary from about 0.05 to 3% by weight of the latex, and preferably from about 0.1 to 1% by weight of the latex.

The presence of the organic or inorganic bases heretofore mentioned unexpectedly promotes polymer molecular weight and structure formation that improves blister resistance of the coating and the rheological properties of the paper coating color composition.

The polymeric latex of the present invention is prepared by conventional emulsion polymerization techniques, such as described by Woods et al, Journal of Paint Technology, vol 40, p. 541 (1968). Anionic or nonionic surfactants can be used to stabilize the latex particles, such as salts of alkyl sulfates, sulfonates, sulfosuccinates, organic phosphate esters, and the like. Conventional initiators, such as persulfates, peroxides or red-ox compounds can be used to initiate polymerization.

The paper coating compositions of this invention comprise a finely divided mineral pigment, a polymeric latex binder as described above, natural or synthetic co-binders, and any of the paper coating additives well known to those skilled in the art, dispersed in a water medium.

Examples of the finely divided pigment include kaolin clays, calcium carbonate, titanium dioxide, zinc oxide, satin white and the like. The particle sizes of the pigments generally vary from about 0.5 to 2 microns on the average. Natural co-binders include starches, and proteins such as casein and soy protein which are usually chemically-modified to make them suitable for paper coating compositions. Polyvinyl alcohol is an example of a synthetic co-binder which is sometimes used.

Paper coating additives which are often used include dispersants such as polyphosphates and naphthalene sulfonates, foam control agents, viscosity-modifiers, water retention agents, lubricants, insolubilizers and preservatives. These paper coating additives are described in detail in the monograph "Paper Coating Additives" edited by Landes and Kroll (1978) which is incorporated by reference herein, and available from the Technical Association of Pulp and Paper Industries (TAPPI).

Typically, the coating composition comprises 100 parts pigment containing from about 65 to 100 parts clay and from about 0 to about 35 parts of at least one other pigment; about 0.1 to 0.4 parts dispersant; and from about 2 to 20 parts, preferably from about 10 to 18 parts of the latex binder; and about 0 to 10 parts of co-binder by weight. Each of the components above is mixed in an aqueous medium to yield a coating color composition which is about 50 to 75 percent solids by weight.

The coating compositions described herein may be applied to paper webs using any of the conventional coating devices such as blade coaters, air knife coaters, rod coaters, roll coaters and the like, by methods known to those skilled in the art.

The following examples serve to illustrate the specific embodiments of the present invention. All parts and percentages are by weight, unless otherwise indicated.

EXAMPLE 1

An agitated autoclave was charged with 186.5 grams of distilled water, 2 grams of a 5% solution of the sodium salt of ethylene diamine tetraacetic acid, 3.6 grams of sodium lauryl sulfate (Sipex UB, Alcolac, Inc.), 4.0 grams of a 45% solution of diisobutyl sodium sulfosuccinate (Monawet MB-45, Mona Industries Inc.), 8.9 grams of 22.5% sodium dodecylbenzene sulfonate (Polystep A13, Stepan Chemical Co.), 20 grams of 4% sodium hydroxide, 105.4 grams of styrene, 67.6 grams of butadiene, 17.6 grams of methyl methacrylate, 4 grams of methacrylic acid, 5 grams of fumaric acid, 3 grams of tert-dodecyl mercaptan and 2.4 grams of potassium persulfate. The autoclave was heated under agitation to 65° C. After agitating at 65° C. for six hours the reaction was vacuum stripped to remove unreacted monomer; cooled and filtered. The resulting latex had a non-volatile content of 52.0%.

EXAMPLE 2

The procedure and all components used in Example 1 was repeated except that 2 grams of glycine (technical grade) replaced the sodium hydroxide, and the amount of methyl methacrylate was increased to 18 grams. The resulting latex had a non-volatile content of 52.0%.

EXAMPLE 3

Coating color compositions (64% solids) were prepared using the polymer latices from Examples 1 and 2 in accordance with the following formulation:

| Color Coating Composition | Amount (parts) |
|---|---|
| Kaolinite clay (Alphacote TM, English China Clay Co.) | 50 |
| Calcium carbonate slurry (75%) (Carbitol 90 TM, English China Clay Co.) | 50 |
| Polymer latex (from Examples 1 and 2, and commercial formulations) | 14 (dry solids) |
| Liquid lubricant (Nopcote C104 TM, Diamond Shamrock) | 0.4 |
| Melamine-formaldehyde (80%) (Resimene 841 TM, Monsanto) | 0.4 |
| Thickener (Kelgin HV TM, Kelco Co.) | 0.2 |
| Dispersant (Dispex N-40 TM, Allied Colloids) | 0.1 |

The thickener was added to water in which the dispersant had been dissolved while agitating with a Cowles Blade (3 inch blade, 600 rpm) for 10 minutes. The kaolinite clay was added, followed by the 75% calcium carbonate slurry under agitation. Lastly, the liquid lubricant and the 80% melamine-formaldehyde resin solution were added. The coating color composition was agitated for 20 minutes. Separate samples were prepared using the polymer latices of Example 1, Example 2. a commercial styrene butadiene latex (Tylac TM, Reichhold Chemicals, Inc.) and a commercial polyvinyl acetate latex (Synthemul TM, Reichhold Chemicals, Inc.) by mixing in under agitation the 14 parts by weight of each polymer latex to provide the amount of dry solids indicated in the above formulation. Water was added to each coating color formulation to adjust the solids content to 64 percent and adjusted to a pH of 8.5 with aqueous ammonia.

The viscosity of each latex was measured with a Brookfield synchro-lectric viscometer Model HAT with the #2 bob at 20 rpm. The viscosity of each coating color composition with the latices under test was measured with a Brookfield Synchro-lectric viscometer Model RVT with the #5 bob at 100 rpm. A rheogram was recorded on a Hercules high-shear viscometer Model EC24-6 with the E bob and the 400,000 dyne spring for each of the latices. Viscosity results are tabulated in Table 1 as follows:

TABLE 1

| Coating Color Composition | VISCOSITY | | | |
|---|---|---|---|---|
| | Brookfield | | Hercules | |
| | Latex | Color | 4.4K | 2.2K |
| Example 1 | 268 | 984 | 48.0 | 47.0 |
| Example 2 | 460 | 984 | 44.0 | 43.5 |
| Commercial Styrene butadiene[a] | 100 | 800 | 59.8 | 48.5 |
| Commercial Polyvinyl acetate[b] | 50 | 880 | 58.5 | 42.0 |

[a] Reichhold Tylac TM 97-757
[b] Reichhold Synthemul TM 40-447

In Table 1, the latex viscosity of Examples 1 and 2 was higher than the two commercial latices but the coating color Brookfield viscosity was not much higher for Examples 1 and 2 than it was for the commercial latices. The Hercules viscosities for the coating color, indicative of high speed blade coater runnability, were much lower with Examples 1 and 2 than with the two commercial latices. In addition, the values at 4400 rpm and 2200 rpm were almost identical with Examples 1 and 2 whereas the viscosity for the commercial styrene butadiene and the polyvinyl acetate latices at 2200 rpm were 17.9 and 28.2 percent, respectively, which were lower than the viscosity at 4400 rpm. This indicates that the coating color compositions with the inventive latex possessed Newtonian rheology and were considerably more stable than the color compositions with the commercial latices.

Each coating color composition was applied at a rate of from about 6 to about 12 lbs/3300 ft² to 59 lb base paper. The coatings were applied with a Cylindrical Laboratory Coater (Sensor & Simulation Products, Division of Weyerhaueser) at 3000 ft/minute. The coated paper was then calendered three nips through a B. F. Perkins laboratory calender at 1000 psi, 130° F. and 100 ft./min. The calendered paper was conditioned at 50% (±2%) relative humidity and 23° C. (±1° C.) (TAPPI standard conditions). The percent moisture in the coated paper under these conditions averaged 3.9±0.2 percent.

The coated papers were subjected to several standard paper coating tests including gloss (Hunter 75°), printed gloss, brightness (Martin Sweets Standard color brightness tester), roughness (Parker Print-Surf), porosity (Sheffield) and wet pick (prufbau TM) and a printed blister test.

Gloss prints were made on a prufbau printability tester. The machine was set at a speed of one meter/second and a force of 1000 Newtons. A volume of 0.3 milliliters of Suntec 1300 ink was applied to each print (1⅛ × 10 inch printed area). The test prints were cured in a microwave oven (General Electric Spacemaker III, Model No. JEM4G 001, 1.0 Kilowatt) on power setting 5 for 2 minutes. Samples were printed and tested in the machine direction. Gloss was measured with a 75. glossmeter (Model 48-7, Hunterlab Assoc. Lab., Inc.).

The wet pick was measured on the prufbau Proof Press Type MZ-II equipped with the Offset Attachment, 7 speed drive. The rollers were inked with 0.3 milliliters of Inmont IPI #2 tack graded ink. A volume of 0.02 milliliter of fountain solution was applied at the moisture box at 1.0 meter per second. After a dwell of 5 seconds, printing occurred at 1.0 meters/second and a force of 1000 Newtons (acceleration mode switch set to 0). Three readings were taken with an RD 918 Macbeth Densitometer at each of five positions along the printed strip, one on the printed area and one on either side of the printed area. The ratio of readings from the printed to the average of the unprinted areas was recorded as wet pick.

The blister test was conducted as follows: A 3×6¼ inch area of the double coated paper was printed on both sides with Suntec 1300 ink (Sun Chemical) offset from a Warren #3 block (Precision Gage & Tool Co., Dayton, Ohio) milled to a depth of 4 mils 0.004 inches) on a Vandercook proof press. The sample was then passed through a 1000° F. oven at a speed such that its surface temperature at the exit of the oven was 310° F. The number of blisters within the test area were counted to give an indication of the tendency of the coating to blister. The results of these tests are tabulated in Table 2 which follows:

TABLE 2

| Coating Color Composition | Coat Weight (lbs/3300 ft²) | Hunter Gloss | Inked Gloss | Brightness | Roughness | Porosity | Wet Pick | Print Blister |
|---|---|---|---|---|---|---|---|---|
| Example 1 | 6.0 | 51.4 | 77.3 | 79.2 | 1.71 | 31 | 0.86 | 0 |
| Example 1 | 6.8 | 56.0 | 78.3 | 79.4 | 1.55 | 28 | 0.84 | 1 |
| Example 1 | 8.7 | 62.6 | 87.1 | 80.1 | 1.44 | 23 | 0.62 | 1 |
| Example 1 | 12.6 | 70.9 | 91.6 | 81.0 | 1.18 | 18 | 0.49 | 1 |
| Example 2 | 5.9 | 51.2 | 79.1 | 79.1 | 1.77 | 29 | 0.92 | 1 |
| Example 2 | 6.8 | 51.8 | 77.8 | 79.3 | 1.72 | 26 | 0.87 | 0 |
| Example 2 | 8.4 | 61.2 | 84.7 | 80.0 | 1.42 | 23 | 0.87 | 1 |
| Example 2 | 11.4 | 68.9 | 89.9 | 80.3 | 1.32 | 20 | 0.59 | 1 |
| SB latex[a] | 5.9 | 58.4 | 68.8 | 78.9 | 1.50 | 27 | 0.64 | 25+ |
| SB latex[a] | 7.7 | 64.5 | 72.8 | 79.3 | 1.38 | 25 | 0.38 | 25+ |
| SB latex[a] | 9.6 | 69.4 | 76.6 | 79.6 | 1.19 | 25 | 0.25 | 25+ |
| SB latex[a] | 13.0 | 72.6 | 83.7 | 80.1 | 1.10 | 25 | 0.21 | 25+ |
| pVAc latex[b] | 6.0 | 46.4 | 64.7 | 79.3 | 1.96 | 34 | 0.32 | 0 |
| pVAc latex[b] | 7.3 | 50.3 | 65.7 | 79.8 | 1.81 | 32 | 0.23 | 0 |
| pVAc latex[b] | 8.7 | 56.2 | 68.1 | 80.4 | 1.61 | 30 | 0.18 | 0 |

TABLE 2-continued

| Coating Color Composition | Coat Weight (lbs/3300 ft²) | Hunter Gloss | Inked Gloss | Brightness | Roughness | Porosity | Wet Pick | Print Blister |
|---|---|---|---|---|---|---|---|---|
| pVAc latex[b] | 11.7 | 63.2 | 72.5 | 81.2 | 1.41 | 30 | 0.12 | 0 |

[a]Reichhold Tylac ™ 97-757
[b]Reichhold Synthemul ™ 40-447

FIG. 1 is a plot of the print gloss data from Table 2 in relation to various coating weights for the different latex compositions. The print gloss of coatings with the commercial styrene butadiene latex, over the range of coat weights tested, is between five and ten points higher than that obtained with coatings containing a commercial polyvinylacetate latex. Remarkably, the print gloss of the coatings with Examples 1 and 2 was between seven and twelve points higher than that obtained with the commercial styrene butadiene latex. The shape of the graphed print gloss data from Examples 1 and 2 indicates that the print glosses at 12.6 lbs/3300 ft² are little better than were seen at 10 lbs/3300 ft². This phenomenon, higher print gloss at intermediate coat weights, can be of inestimable value to paper mills making light-weight coated grades.

The brightness values from Table 2 have been plotted in FIG. 2. The brightness of coatings with commercial polyvinyl acetate latices is usually higher than the brightness with commercial styrene butadiene latices. As seen in FIG. 2, the brightness of coatings with the commercial polyvinyl acetate latex was from 0.4 to 1.3 points higher than the brightness observed with the commercial styrene butadiene latex. The brightness of coatings with the Example 1 latex was considerably higher than one would expect for a predominantly styrene butadiene latex. For example, at a coat weight of 11.4 lbs/3300 ft², the brightness was 1.1 points higher than with the commercial styrene butadiene latex. This property is also of great value to manufacturers of light-weight coated grades.

Unusual strength properties were obtained with the coatings made with the latices of Examples 1 and 2. In FIG. 3, the prufbau wet pick of this coating with Example 2 at 7 lbs/3300 ft² was more than 104% higher than with the commercial styrene butadiene latex and 291% higher than with the commercial polyvinyl acetate latex.

The data for the number of print blisters in Table 2 was obtained by observation after passing the printed coated papers through the curing oven. The number of blisters seen with the coatings containing the Examples 1 and 2 latices averaged either one or zero blisters for the two strips tested. This was within experimental error of the number of blisters observed with the commercial polyvinyl acetate latex at any coat weight. The number of blisters with the commercial styrene butadiene latex was greater than 25 and too many to count at any coat weight.

Figure 4:
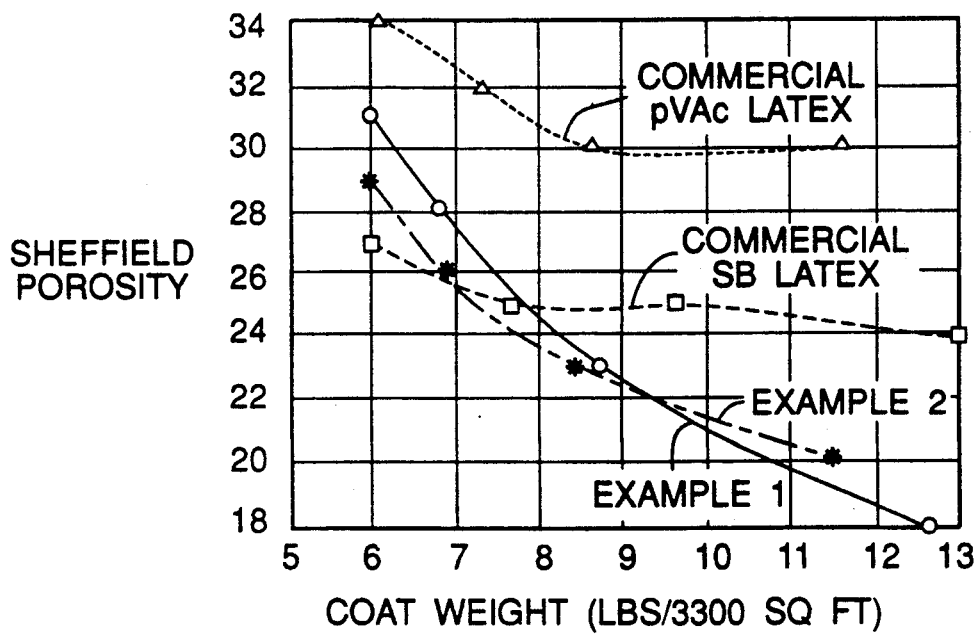
FIG. 4 is a graphical representation of Sheffield porosity to variations in coating weight for different latex compositions.

Usually, a more porous coating would be expected to give better blister resistance. FIG. 4 shows the Sheffield porosity data plotted from Table 2. The polyvinyl acetate latex coating yielded porosity values which are about six points higher than coatings with the commercial styrene butadiene latex at any coat weight. Surprisingly, Examples 1 and 2 gave lower Sheffield porosity values than with commercial styrene butadiene latex above 8 lbs/3300 ft². This is remarkable in view of the fact that Example 1 coatings with the Example 1 and 2 latices were equally resistant to blistering compared with the commercial polyvinyl acetate latex coatings.

What is claimed is:

1. In a coating composition for paper comprising a polymer latex prepared by emulsion polymerizing:
   (a) an aliphatic conjugated diene monomer,
   (b) an non-carboxylic monoethylenic monomer, and
   (c) an ethylenically unsaturated carboxylic acid monomer, the improvement which consists essentially of conducting the polymerization in the absence of an alkyl halide and in the presence of about 0.5 to 5% by weight of an organosulfur molecular weight modifier and about 0.05 to 3% by weight of a base.

2. The composition of claim 1 wherein the non-carboxylic monoethylenic monomer is at least one selected from the group consisting of vinyl aryls, alkyl esters of unsaturated carboxylic acids and vinyl cyanides.

3. The composition of claim 2, wherein the vinyl aryls are selected from the group consisting of styrene, α-methylstyrene, methyl-c-methylstyrene, and vinyl toluene.

4. The composition of claim 3, wherein the vinyl aryl is styrene.

5. The composition of claim 2, wherein the alkyl esters of unsaturated carboxylic acids are selected from the group consisting of methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, β-hydroxyethyl acrylate, and 2-ethyl-hexyl acrylate.

6. The composition of claim 5, wherein the alkyl ester is methyl methacrylate.

7. The composition of claim 2, wherein the vinyl cyanides are selected from the group consisting of acrylonitrile and methacrylonitrile.

8. The composition of claim 1, wherein the aliphatic conjugated diene monomer is at least one selected from the group consisting of 1,3-butadiene, 2-methyl-1,3-butadiene, and 2-chloro-1,3-butadiene.

9. The composition of claim 8, wherein the aliphatic conjugated diene monomer is 1,3-butadiene.

10. The composition of claim 1, wherein the ethylenically unsaturated carboxylic acid monomers include at least one selected from the group consisting of acrylic acid, methacrylic acid, itaconic acid, fumaric acid, maleic acid, and the C1 to C8 alkyl half esters of fumaric, maleic and itaconic acid.

11. The composition of claim 1, wherein the amount of aliphatic conjugated diene monomer varies from about 10 to 90% by weight of the polymeric latex.

12. The composition of claim 1, wherein the non-carboxylic monoethylenic monomer varies from about 10% to 90% by weight of the polymeric latex.

13. The composition of claim 1, wherein the ethylenically unsaturated carboxylic acid monomers vary from about to 20% by weight of the polymer latex.

14. The composition of claim 1, wherein the organosulfur molecular weight modifiers include at least one selected from the group consisting of mercaptans and mercaptoalcohols.

15. The composition of claim 1, wherein the base is an inorganic base or an organic base.

16. The composition of claim 15, wherein the base has a pKb which varies from about −4 to 18.

17. The composition of claim 15, wherein the organic base contains oxygen and is selected from the group consisting of alkali metal, ammonium, and alkyl ammonium salts of carboxylic acids, dibasic carboxylic acids, and unsaturated carboxylic acids.

18. The composition of claim 15, wherein the organic base contains nitrogen and is selected from the group consisting of alkyl and aryl amines, cyclic amines, aliphatic amino acids, aromatic amino acids, cyclic lactams of amino acids, primary amides, secondary amides and diamides.

19. The composition of claim 17, wherein the unsaturated carboxylic acid is polymerizable and is selected from the group of acrylic acid, methacrylic acid, itaconic acid, fumaric acid, maleic acid, and the $C_1$ to $C_8$ alkyl half esters of fumaric, maleic and itaconic acid.

20. The composition of claim 15, wherein the organic base is glycine.

21. The composition of claim 15, wherein the organic base is selected from the group consisting of quaternary alkyl ammonium hydroxides, hydrosulfides, carbonates and bicarbonates.

22. The composition of claim 15, wherein the inorganic base is selected from the group consisting of alkali metal and ammonium hydroxides, hydrosulfides, carbonates and bicarbonates.

23. The composition of claim 15 wherein the inorganic base is sodium hydroxide.

24. The composition of claim 1, also including a finely divided mineral pigment and dispersant.

25. The composition of claim 1, wherein the coating composition exists in aqueous media which contains about 50 to 75% total solids, by weight.

* * * * *

UNITED STATES PATENT AND TRADEMARK OFFICE
CERTIFICATE OF CORRECTION

PATENT NO. : 5,141,988

DATED : August 25, 1992

INVENTOR(S) : David W. Suwala et al

It is certified that error appears in the above-identified patent and that said Letters Patent is hereby corrected as shown below:

```
column 4, line 7, after "about" insert --1--.

column 4, line 18, change "→" to --↔--.

column 8, line 24, change "75." to --75°--.

column 8, line 40, change "6¼" to --6½--.

column 8, line 44, change "0.004" to -- ( .004.

column 10, line 29, change "-c-" to -- -α- --.

column 10, line 66, after "about" insert --1--.
```

Signed and Sealed this

Sixteenth Day of November, 1993

Attest:

BRUCE LEHMAN

*Attesting Officer*  *Commissioner of Patents and Trademarks*